United States Patent
Daum

[19]

[11] Patent Number: 6,128,170
[45] Date of Patent: Oct. 3, 2000

[54] ANALOG BASED FIRST AND FAST SECOND PULSE REMOVAL SYSTEM

[75] Inventor: Wolfgang Daum, Louisville, Ky.

[73] Assignee: General Electric Company, Schenectady, N.Y.

[21] Appl. No.: 09/195,648

[22] Filed: Nov. 19, 1998

[51] Int. Cl.$^7$ ...................................................... H02H 3/18
[52] U.S. Cl. .............................................. 361/42; 361/78
[58] Field of Search .............................. 361/42, 93.1, 78, 361/86, 87, 79

[56] References Cited

U.S. PATENT DOCUMENTS

| | | | |
|---|---|---|---|
| 4,376,243 | 3/1983 | Renn et al. | 219/514 |
| 5,910,872 | 6/1999 | Marmonier et al. | 361/2 |
| 5,940,256 | 8/1999 | MacKenzie et al. | 361/42 |

OTHER PUBLICATIONS

"Arc Fault Circuit Interrupters," Dr. Wolfgang Daum, UL 1699–1, Section 13, Nov. 1996.

*Primary Examiner*—Michael J. Sherry
*Attorney, Agent, or Firm*—John F. Thompson; Jill M. Breedlove

[57] ABSTRACT

A silicon controller rectifier based analog circuit 10 that can be utilized in connection with known analog based residential arc detecting circuit breakers to reduce false tripping of the breakers is described. By eliminating the first current pulse in the time attenuated pulse counting circuit 10 as well as fast, subsequent cycle pulses, the possible tripping due to the one or two pulse lamp burnout false trips is substantially eliminated. The circuit 10 eliminates a first arc pulse in all conditions and a second arc pulse if it quickly follows the first pulse, thus reducing the breaker sensitivity as little as possible while significantly reducing, if not eliminating, false tripping when two consecutive high current arc pulses are generated.

16 Claims, 1 Drawing Sheet

ANALOG BASED FIRST AND FAST SECOND PULSE REMOVAL SYSTEM

BACKGROUND OF THE INVENTION

This invention relates generally to circuit breakers and, more particularly, to arc detection in residential circuit breakers.

Circuit breakers typically are used in residences in order to prevent abnormal operation of a residential circuit to protect residential wiring, e.g., in the wall wiring, power outlet connectors, extension cords, appliance cords and appliances. Although detection of arcs is desirable to reduce the possibility of a fire being started by an arc and to protect residential wiring, known residential circuit breakers typically do not include an arc detection unit.

Circuit breakers systems typically comprise a main circuit breaker line, and several branch circuit breaker lines. More specifically, arcs generally can be identified by the high frequency content of current flowing in a branch line. High frequency current, e.g., current having a frequency exceeding the range of 1 KHz to 10 MHz, can be introduced into the branch line, however, through many benign apparatuses such as universal motors in hair dryers, drills, and vacuum cleaners. Such motors can produce significant high frequency energy due to the arcing of the brush motor commutation. Silicon controlled rectifier lamp dimmers and advanced electronic devices can also generate high frequency energy. Discriminating between actual arcing faults and benign sources of high frequency energy therefore is much more difficult than just sensing a high frequency. A residential arc detection unit, however, must have a low false alarm rate. Known arc detection units having the necessary low false alarm rate are expensive.

To reduce the costs of arc detection units, some known circuit breakers include central processing units that execute algorithms to eliminate possible noise sources, such as electric household appliances and tools (e.g., motors, welders, switches). Such known algorithms utilize Fourier analysis and other frequency domain based approaches. The noise sources are eliminated from the primary signal by classifying the noise resulting from such sources, and then using such classified signals to identify noise signals and sources in the primary signal. The noise signals are then subtracted from the primary signal so that the noise portion of the signal is eliminated.

The functional requirements for digital signal processing based on the elimination of noise sources requires correct classification of noise signals followed by the storage of data, i.e., storage of the portion of the primary signal associated with the noise signal. The processing power necessary to provide this function is high and increases proportionately with the number of noise sources present as well as the frequency range used because of Fourier Transform calculation requirements.

In one known analog breaker configuration, tripping occurs when 4 or more arc pulses are detected in a sliding 0.5 second window. Under certain conditions, such as lamp burnout, two consecutive high current arc pulses are generated that are known to cause false unit tripping. It would be desirable to provide methods and apparatus for reducing false tripping of an analog breaker configuration arc protection at a low cost as compared to the costs associated with using sophisticated arc detection units.

BRIEF SUMMARY OF THE INVENTION

These and other objects may be attained by a silicon controlled rectifier based analog circuit that can be utilized in connection with known analog based residential arc detecting circuit breakers to reduce false tripping of the breakers. More particularly, by eliminating the first current pulse in the time attenuated pulse counting circuit as well as fast, subsequent cycle pulses, possible tripping due to the one or two pulse lamp burnout false trips is substantially eliminated. That is, the apparatus and methods described herein eliminate a first arc pulse in all conditions and a second arc pulse if it quickly follows the first pulse, thus reducing the breaker sensitivity as little as possible while significantly reducing, if not eliminating, false tripping when two consecutive high current arc pulses are generated.

DETAILED DESCRIPTION OF THE INVENTION

As explained above, and in one aspect, the present invention relates to a silicon controller rectifier based analog circuit that can be utilized in connection with known analog based residential arc detecting circuit breakers to reduce false tripping of the breakers. The circuit, sometimes referred to herein as a pulse removal unit, is configured to eliminate a first arc pulse in all conditions and a second arc pulse if it quickly follows the first pulse. By eliminating such pulses, the breaker sensitivity is impacted as little as possible yet false tripping is significantly reduced under certain conditions, i.e., false tripping when two consecutive high current arc pulses are generated due, for example, to lamp burnout.

Figure 1:
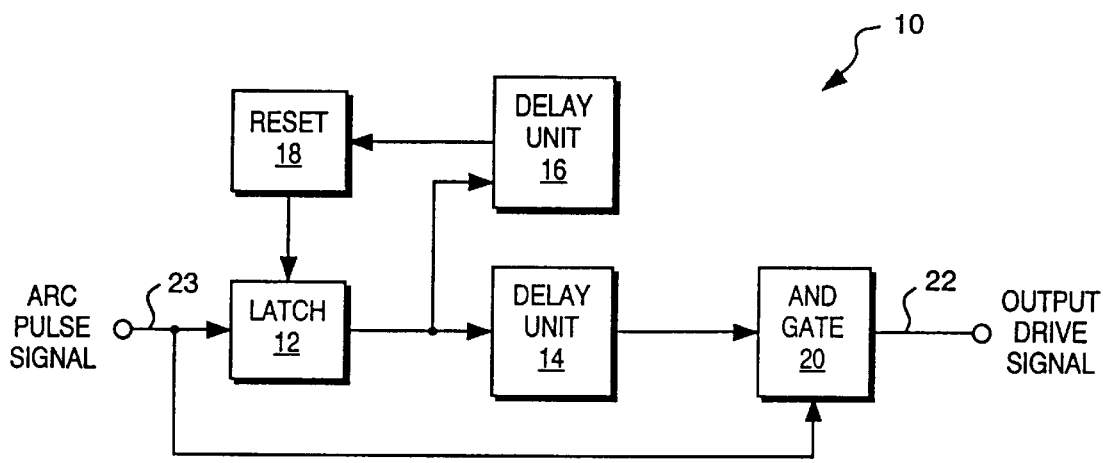
FIG. 1 is a block diagram of a pulse removal unit in accordance with one embodiment of the present invention.

Pulse removal unit 10, as illustrated in FIG. 1, operates to allow the arc pulse signal on arc pulse signal line 23 which is coupled to a latch 12 to pass to an output driver line 22 when certain conditions are met. Generally, upon detecting a first pulse, and if a second pulse is detected within delay time 1 of delay unit 14 of detection of the first pulse, both the first pulse and the second pulse are not coupled to output driver line 22 for further processing (circuitry not shown). If, however, detection of the first and second pulses occurs more than delay time 1 apart, then the second pulse is coupled to output driver line 22 and further processing is performed (circuitry not shown) to determine whether a trip condition has occurred. Delay time 1 of delay unit 14 is typically less than 0.1 seconds to capture only first and second pulses that are in quick succession.

FIG. 1 is a block diagram illustration of pulse removal unit 10 in accordance with one embodiment of the present invention. Unit 10 includes latch 12 which is coupled to a first delay unit 14 and a second delay unit 16. Arc pulse signal line 23 is coupled to latch 12. The arc pulse signal may comprise any number of pulses from a single pulse up to a plurality of pulses. The output of second delay unit 16 is coupled to a reset 18. Second delay unit 16 is configured so that a latch signal generated by latch 12 is received by delay unit 16 and is, correspondingly, coupled to reset unit 18 after about 0.5 seconds have elapsed. The 0.5 second delay utilized within this specification is defined in proposed UL specification, UL 1699-1, entitled, *Arc Fault Circuit Interrupters*, dated November 1996, at section 13, which is promulgated by Underwriters Laboratory, and is herein incorporated by reference. Reset 18 is coupled to latch 12. The output of first delay unit 14 is coupled to an AND gate 20. AND gate 20 is coupled to arc pulse signal line 23 and also coupled to an output driver line 22.

The arc pulse signal is provided as an input to pulse removal unit 10. During normal operation a pulse on arc pulse signal triggers latch 12. Latch 12 generates a latch signal which triggers a 0.5 sec sliding window reset function (i.e., second delay unit 16 further described below) and activates one input of AND gate 20 via first delay unit 14. First delay unit 14 is configured to delay the latch signal generated by latch 12 less than 0.5 seconds. If the latch signal is active for a duration greater than the delay time of delay unit 14, then delay unit 14 will generate a enable signal which is coupled to AND gate 20. Generally, if the duration of a first pulse of a pulse train on arc pulse signal is more than delay time 1, then the second pulse causes AND gate 20 to couple the arc pulse signal to output driver line 22. Thus, for example, when two consecutive pulses on arc pulse signal line 23 are spaced less delay time 1 apart no output drive signal is generated on output drive line 22, whereas when two consecutive pulses on arc pulse signal line 23 are spaced more than delay time 1 apart but less than about 0.5 seconds apart one pulse is coupled to output drive line 22 via AND gate 20. Latch 12 is reset by a latch reset signal after a time delay of about 0.5 sec (reset delay unit 16 generates the 0.5 second time delay), thus imposing a sliding 0.5 second window. As such, whenever latch 12 generates a latch signal, latch 12 is subsequently reset in about 0.5 seconds by the actions of delay unit 16 and reset 18. Latch 12 is configured to give the reset signal generated by reset 18 priority over the arc pulse signal (i.e. the reset signal will reset latch 12 even though an arc pulse signal is present).

Under normal operation, a single pulse having a duration of less than 0.5 seconds will set latch 12, however, delay unit 14 will not couple the enable signal to AND gate 20 to prevent the arc pulse signal from being coupled to output driver line 22. Latch 12 is subsequently reset after about 0.5 seconds (i.e. the time delay of delay unit 16). When the arc pulse signal generates multiple consecutive pulses where the time spacing between the pulses is less than about 0.5 seconds), first delay unit 14 delays sending the enable signal to AND gate 20 so that AND gate 20 is not enabled to couple either the first or second pulses to output driver line 22. Subsequent pulses within the 0.5 second window that have a duration longer than the delay time of delay unit 14, however, are coupled to output driver line 22. Given a pulse train where the time spacing between the first two pulses is longer than delay time 1 but less than about 0.5 seconds, the second pulse is coupled to output drive line 22 by AND gate 20 for further action after the first pulse is prevented from being coupled to output drive line 22. Subsequent pulses are also coupled to output driver line 22, as long as latch 12 has not been reset. Once latch 12 is reset the next pulse that is detected is treated as the above described first pulse, and the above described process is repeated.

Figure 2:
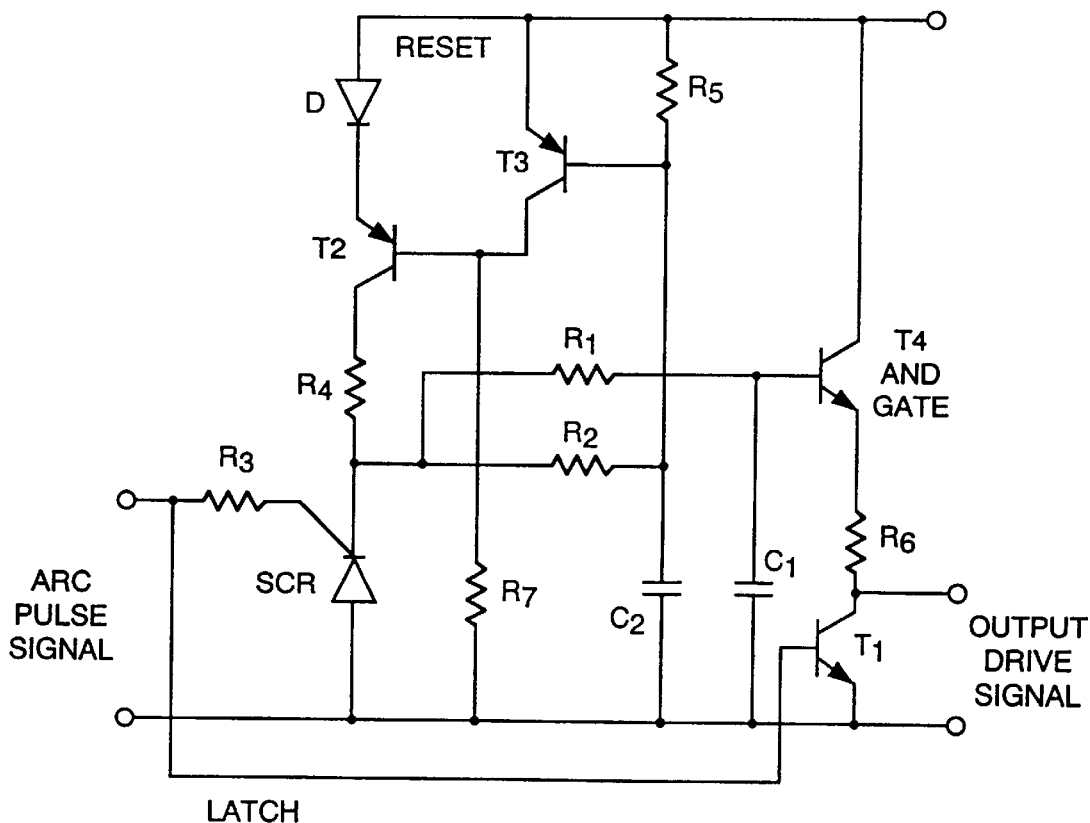
FIG. 2 is a circuit schematic diagram of one implementation of the block diagram illustrated in FIG. 1.

FIG. 2 is a circuit schematic diagram of a circuit 50 configured in accordance with the block diagram illustrated in FIG. 1 using bipolar transistors. A latch (latch 12 in FIG. 1) is created by a shifted back-to-back npn-pnp transistor T1 and a silicon controlled rectifier SCR. A first delay (first delay unit 14 in FIG. 1) is formed by the time constant of resistor R1 and capacitor C1, and the second delay (second delay unit 16 in FIG. 1) is formed by the time constant of resistor R2 and capacitor C2. The reset function (reset unit 18 in FIG. 1) is performed by transistors T2 and T3, and the and gate function (AND gate 20 in FIG. 1) is performed by transistor T4. Resistors R3, R4, R5, R6, and R7 are biasing resistors.

The above described pulse elimination unit 10 can be utilized in connection with known analog based residential arc detecting circuit breakers to reduce false tripping of the breakers. By eliminating the first current pulse in the time attenuated pulse counting circuit as well as fast, subsequent cycle pulses, possible tripping due to the one or two pulse lamp burnout false trips is substantially eliminated.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A pulse removal unit configured to be coupled to a residential circuit breaker, said pulse removal unit comprising:

a latch for receiving an arc pulse signal, wherein said latch generates a latch signal upon receiving the arc pulse signal;

a first delay unit coupled to said latch, wherein said first delay unit generates an enable signal upon receiving the latch signal;

an AND gate coupled to said first delay unit and configured to receive the arc pulse signal, wherein said AND gate generates an output drive signal comprising said arc pulse signal;

a second delay unit coupled to said latch; and a reset unit coupled to said second delay unit and coupled to said latch, wherein said reset unit generates a reset signal that acts to reset said latch.

2. A pulse removal unit in accordance with claim 1, wherein said latch comprises a shifted back-to-back npn-pnp transistor.

3. A pulse removal unit in accordance with claim 1, wherein said first delay unit delays generation of the enable signal by less than 0.5 seconds after receiving the latch signal.

4. A pulse removal unit in accordance with claim 1, wherein said second delay unit delays generation of the reset signal by about 0.5 seconds after receiving the latch signal.

5. A pulse removal unit in accordance with claim 1, comprising first and second resistors, and first and second capacitors, wherein the duration of delay of said first delay unit is controlled by values of said first resistor and said first capacitor, wherein the duration of delay of said second delay unit is controlled by values of said second resistor and said second capacitor.

6. A pulse removal unit in accordance with claim 1, wherein said AND gate comprises a transistor.

7. A method for eliminating pulses supplied to a circuit breaker, said method comprising the steps of:

detecting a first pulse, and if a second pulse is detected within a predetermined time from detection of said first pulse, then preventing said pulses from causing the circuit breaker to trip, wherein said predetermined time is less than 0.1 seconds.

8. A pulse removal unit for detecting pulses on wires supplying power to loads, said unit comprising:

means for detecting multiple pulses on an arc pulse line; and means for determining whether a second pulse is representative of a false trip condition.

9. A pulse removal unit in accordance with claim 8, wherein said detecting means comprises a latch.

10. A pulse removal unit in accordance with claim 9, wherein said latch comprises a shifted back-to-back npn-pnp transistor.

11. A pulse removal unit in accordance with claim 8, wherein said determining means comprises a first delay unit coupled to said latch, and an AND gate coupled to said first delay unit.

12. A pulse removal unit in accordance with claim 11, wherein said first delay unit generates a delay having a duration less than 0.1 seconds.

13. A pulse removal unit in accordance with claim 11, wherein said determining means further comprises a second delay unit coupled to said latch, and a reset unit coupled to said second delay unit, wherein said reset unit generates a reset signal to reset said latch.

14. A pulse removal unit in accordance with claim 13, wherein said second delay unit generates about a 0.5 second delay.

15. A pulse removal unit in accordance with claim 11, wherein said AND gate comprises a transistor.

16. A method for removing pulses supplied to a circuit breaker, said method comprising the steps of:

first detecting a first pulse;

second detecting a second pulse within a predetermined time from said step of first detecting;

preventing said first and second pulses from tripping the circuit breaker when said predetermined time is about 0.5 seconds.

* * * * *